US011329682B2

(12) United States Patent
Duman et al.

(10) Patent No.: US 11,329,682 B2
(45) Date of Patent: May 10, 2022

(54) PORTABLE COMMUNICATION DEVICE WITH NON-TOUCH USER INTERFACE

(71) Applicant: MOTOROLA SOLUTIONS, INC., Chicago, IL (US)

(72) Inventors: Goktug Duman, Oakland Park, FL (US); Lanting L Garra, Sunrise, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 49 days.

(21) Appl. No.: 16/941,740

(22) Filed: Jul. 29, 2020

(65) Prior Publication Data

US 2022/0038128 A1 Feb. 3, 2022

(51) Int. Cl.
*H04B 1/38* (2015.01)
*H04M 1/02* (2006.01)
*H04B 1/3827* (2015.01)
*H04N 5/225* (2006.01)

(52) U.S. Cl.
CPC ......... *H04B 1/3833* (2013.01); *H04N 5/2256* (2013.01); *H04N 5/2257* (2013.01)

(58) Field of Classification Search
CPC ...... H04B 1/38; H04B 1/3827; H04B 1/3833; H04M 1/02; H04M 1/026; H04M 1/0262; H04M 1/0264; H04M 1/0279; H04M 1/03; H04M 2250/52; H04M 2250/74
See application file for complete search history.

(56) References Cited

U.S. PATENT DOCUMENTS

| 8,304,101 | B2 * | 11/2012 | Ouyang | H04M 1/0262 |
| | | | | 429/100 |
| 8,660,621 | B2 * | 2/2014 | Masser | H04M 1/022 |
| | | | | 455/575.3 |
| 8,804,947 | B2 | 8/2014 | Rosenblatt et al. | |
| 9,007,758 | B2 * | 4/2015 | Wilson | H04M 1/7246 |
| | | | | 455/575.4 |

(Continued)

FOREIGN PATENT DOCUMENTS

| EP | 2615520 A2 | 7/2013 |
| EP | 3454541 A1 | 3/2019 |
| JP | 2012239045 A | 12/2012 |

OTHER PUBLICATIONS

Moralejo, Eduardo, et al.: "Portable Radio with Button Over Speaker", U.S. Appl. No. 16/370,072, filed Mar. 29, 2019, all pages.

(Continued)

*Primary Examiner* — Quochien B Vuong
(74) *Attorney, Agent, or Firm* — Barbara R Doutre (57) ABSTRACT

A portable communication device (100) comprises a housing that provides an elongated aperture (114) having a non-touch user interface (116) residing therein. The non-touch user interface (116) is formed of an elongated rounded rectangular shaped body. A plurality of non-touch user interface features (118) are spaced apart side-by-side along the single elongated rounded rectangular shaped body of the non-touch user interface (116). The elongated aperture (114) with non-touch user interface (116) residing therein define a visible non-touch user interface zone (120) on the surface of the portable communication device for the protection of the non-touch user interface features (118).

17 Claims, 5 Drawing Sheets

(56) References Cited

U.S. PATENT DOCUMENTS

| | | | |
|---|---|---|---|
| 9,300,033 B2* | 3/2016 | Han | H04B 1/3827 |
| 9,332,098 B2* | 5/2016 | Horii | H04M 1/035 |
| 9,575,392 B2 | 2/2017 | Hooton et al. | |
| 9,578,155 B2* | 2/2017 | Kim | H04M 1/0202 |
| 9,667,086 B2* | 5/2017 | Koyanagi | H04M 1/0262 |
| 9,736,282 B2* | 8/2017 | Lee | H04M 1/026 |
| 10,651,880 B1 | 5/2020 | Lee et al. | |
| 10,686,971 B1* | 6/2020 | Yoo | H04M 1/0264 |

OTHER PUBLICATIONS

The International Search Report and the Written Opinion, corresponding patent application No. PCT/US2021/039302, filed: Jun. 28, 2021, dated Oct. 28, 2021, all pages.

* cited by examiner

PORTABLE COMMUNICATION DEVICE WITH NON-TOUCH USER INTERFACE

FIELD OF THE INVENTION

The present invention relates generally to portable communication devices and more particularly to user interface features of a portable communication device.

BACKGROUND

Portable communication devices, such as portable radios, are utilized in a wide variety of communication environments, such as business, consumer retail, security and the like. Portable communication devices operate using a variety of user interface features, such as a microphone, speaker, and control buttons. There is an increased demand that such portable communication devices provide camera functionality as an additional, without increasing the overall size of the device. The incorporation of additional user interface features is challenging, due not only to the limited size constraints of the portable device, but also due to the fact that the users themselves may interfere or block one device feature while using another device feature. It is desirable that the incorporation of additional user interface features into a portable communication device not cause the user to block or interfere with other user interface features, such as audio porting.

Accordingly, there is a need for a portable communication device with an improved user interface that overcomes the aforementioned challenges.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in a non-touch user interface for a portable communication device. Accordingly, the components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Briefly, there is provided herein a portable communication device comprising a housing that provides an elongated aperture having a non-touch user interface residing therein. The non-touch user interface is formed of a single elongated rounded rectangular shaped body corresponding to the shape of the elongated aperture. A plurality of non-touch user interface features are adjacently spaced apart side-by-side along the single elongated rounded rectangular shaped body of the non-touch user interface. The elongated aperture with non-touch user interface residing therein, define a visible non-touch user interface zone on a surface of the portable communication device. The visible non-touch user interface zone advantageously provides a dedicated pill shaped keep-out zone to keep non-touch user features from being inadvertently touched, The visible non-touch user interface zone intuitively trains end users to refrain from touching, altering or manipulating the non-touch features, such as speaker porting, camera and flash features thereby minimizing potential damage.

Figure 1:
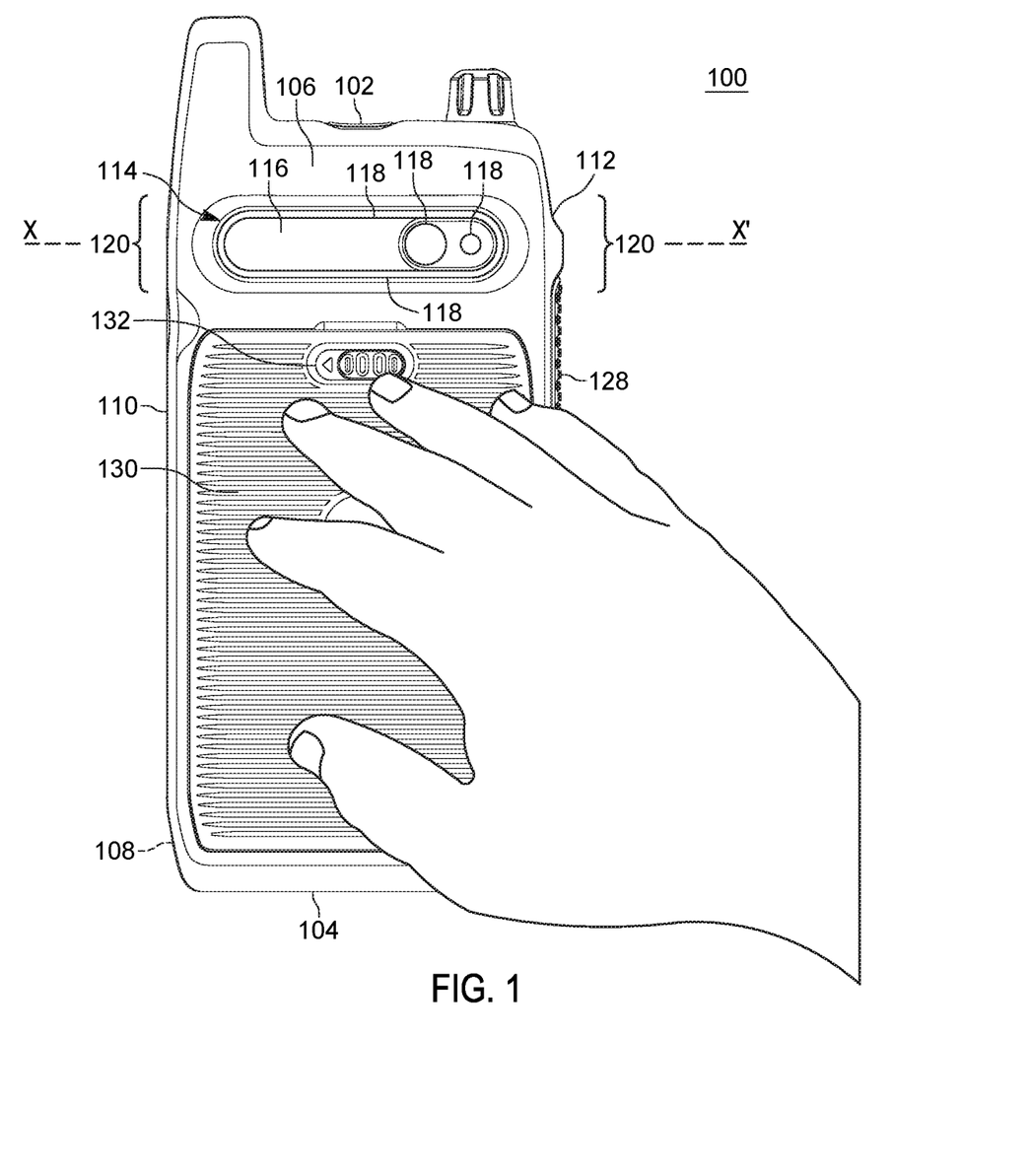
FIG. 1 is a first view of a portable communication device having a visible non-touch user interface zone in accordance with the various embodiments.

FIG. 1 is a first view of a portable communication device 100 formed in accordance with the embodiments. The portable communication device 100 comprises a housing having a plurality of housing surfaces comprising a top surface 102, a bottom surface 104, a front surface 106, a back surface 108, a first side surface 110, and a second side surface 112. An elongated aperture 114 is formed on a surface of the plurality of surfaces, the elongated aperture 114 being formed as an elongated rounded rectangular shaped aperture. In accordance with the embodiments, a non-touch user interface 116 resides within the elongated aperture 114, the non-touch user interface being formed of a single elongated rounded rectangular shaped body corresponding in shape to the elongated aperture. The elongated aperture 114 with non-touch user interface 116 residing therein define a visible non-touch user interface zone 120 on the surface of the portable communication device 100. In accordance with the embodiments, a plurality of non-touch user interface features 118 are adjacently integrated and spaced apart side-by-side along the single elongated rounded rectangular shaped body of the non-touch user interface 116.

The visible non-touch user interface zone 120 formed of elongated aperture 114 with non-touch user interface 116 residing therein are formed of a hard molded plastic as part of the housing thereby providing a monoform form factor.

The visible non-touch user interface zone 120 (defined by the elongated aperture 114 with non-touch user interface 116 residing therein) is elongate and extends along a horizontal axis (x-x') across the front surface 106 of the housing between the first and second side surfaces 110, 112. The visible non-touch user interface zone 120 may alternatively be located on the back surface 108 of the housing between the first and second side surfaces 110, 112.

The portable communication device 100 may be a two-way radio device having a push-to-talk (PTT) button 128. The portable communication device 100 may further comprise a battery cover 130 with battery latch 132 located below the visible non-touch user interface zone 120.

Figure 2:
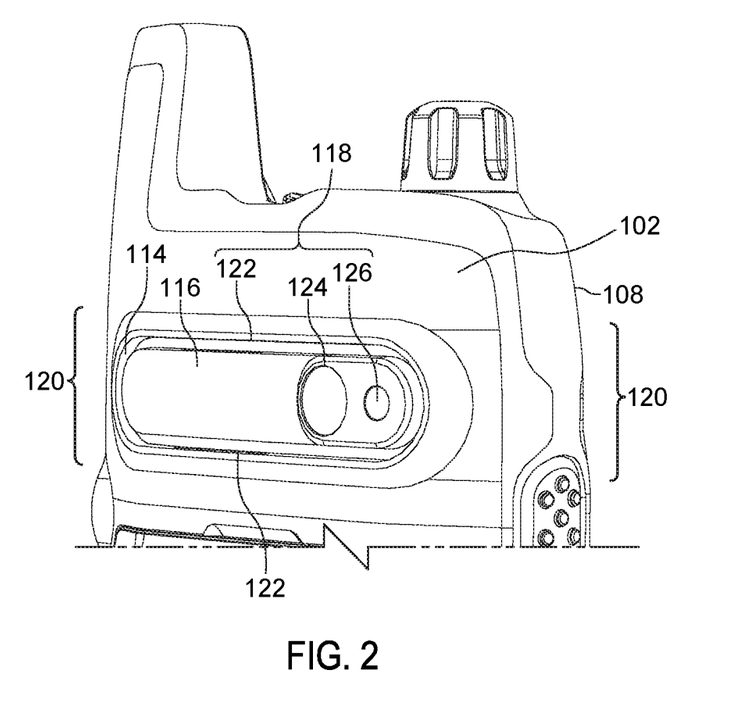
FIG. 2 is a partial perspective view of the portable in accordance with the various embodiments.
Figure 3:
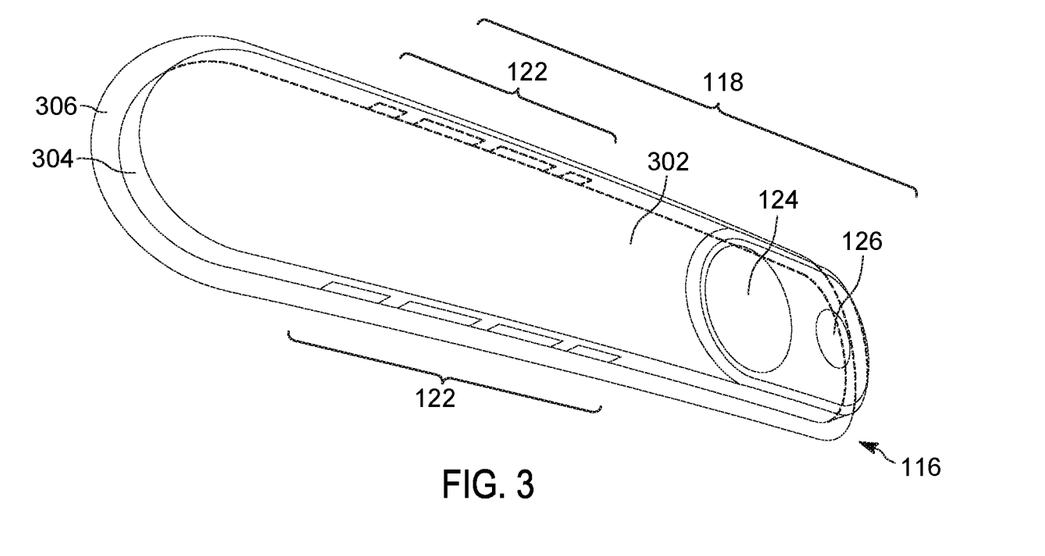
FIG. 3 shows a break-away view of a non-touch user interface in accordance with the various embodiments.

The visible non-touch user interface zone 120 advantageously provides a dedicated keep-out zone to keep non-touch user features from being inadvertently touched, for example when a user is touching an intended touch user interface feature, such as the battery latch 132 located beneath the visible non-touch user interface zone, or other intended touch user interface, FIG. 2 is a partial perspective view of the portable in accordance with the various embodiments. The elongated aperture 114 is a walled aperture extending into the housing forming a recess surrounding the non-touch user interface 116. FIG. 3 shows a break-away view of the non-touch user interface 116 in accordance with the various embodiments. As shown in FIGS. 2 and 3, the plurality of non-touch user interface features 118 comprise a plurality of speaker holes 122, a camera lens 124, and a flash lens 126. The speaker holes 122, camera lens 124, and flash lens 126 are adjacently integrated and spaced apart side-by-side along the single elongated rounded rectangular shaped body of the non-touch user interface 116.

FIG. 3 shows the non-touch user interface 116 formed of the single elongated rounded rectangular shaped body comprising, in accordance with the embodiments, an elongated top planar surface 302, an edge side wall 304 descending downward from the elongated top planar surface, and a base platform 306 extending from and surrounding the edge side wall. The base platform 306 and walled aperture of elongated aperture 114 form the recess surrounding the non-touch user interface 116. The non-touch user interface 116 shown in FIG. 3 is understood to be formed as part of the external surface of the housing, while the interior will be shown later in conjunction with FIG. 5.

FIG. 3 shows the speaker holes 122 integrated within the edge side wall 304 of the non-touch user interface 116, the camera lens 124 integrated within the top planar surface 302 of non-touch user interface, and the flash lens 126 integrated on the top planar surface 302 of the non-touch user interface. The plurality of speaker holes 122 are formed as a first row of speaker holes on a first side wall of the edge side wall 304, and a second row of speaker holes on an opposing second side wall of the edge side wall 304 of the single elongated rounded rectangular shaped body. The first and second rows of speaker holes of edge side wall 304 will be shown in later views to align with corresponding first and second rows of speaker openings formed in an interior aperture wall of the elongated aperture 114.

Figure 4:
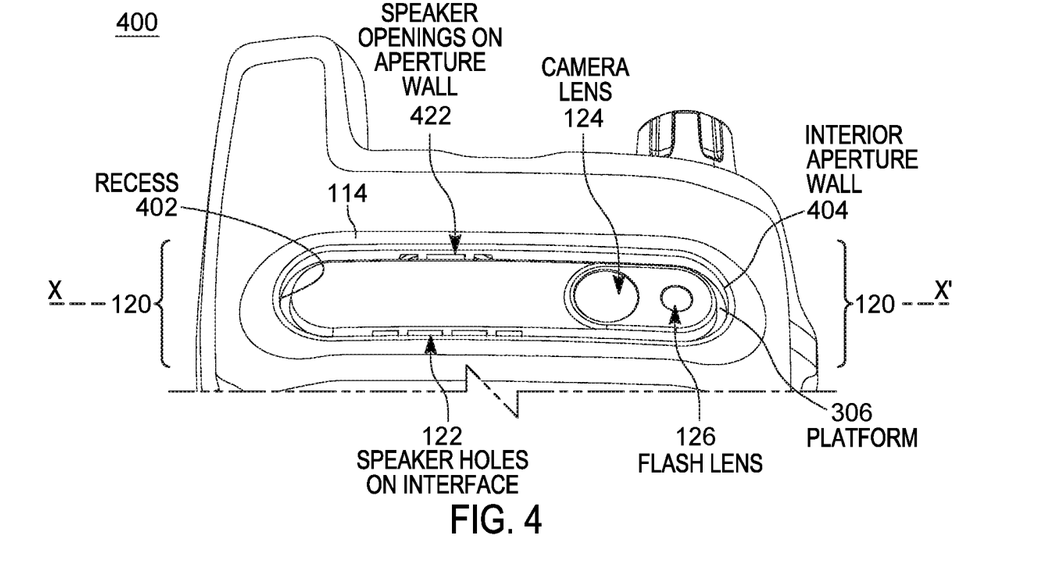
FIG. 4 is a partial tilted top view of the portable communication device in accordance with the various embodiments.

FIG. 4 is a partial tilted view 400 of the portable communication device 100 in accordance with the various embodiments. As shown view 400, the base platform 306 of the non-touch user interface 116 forms a recess 402 between the elongated aperture 114 and the non-touch user interface. The elongated aperture 114 has an interior aperture wall 404 that meets with the base platform 306 forming the recess surrounding the non-touch user interface 116.

In accordance with the embodiments, speaker porting is located within the recess 402. View 400 shows the first row of speaker holes 122 on the edge side wall 304 (second row of speaker holes on an opposing second side are present but not seen in this view). A plurality of speaker openings 422 are located in the interior aperture wall 404 of the elongated aperture 114. In accordance with the embodiments, the plurality of speaker openings 422 located in the interior aperture wall 404 of the elongated aperture 114 align with corresponding speaker holes 122 of the non-touch user interface 116. An additional row of speaker openings 422 (not shown in this view) align with the first row of speaker holes 122 on the opposing side. Hence, speaker porting is formed on first and second elongated recessed portions of the visible non-touch user interface zone 120 with first row of speaker holes 122 aligned with first row of speaker openings 422, and second row of speaker holes 122 aligned with second row of speaker openings 422. The camera lens 124 and flash lens 128 are visible to a user and are considered non-touch user interface elements, while the speaker porting is advantageously concealed from direct view and protected from touch by residing within the side walls of the recess 402.

As shown in FIGS. 1-4, the non-touch user interface features 118 are located side by side along the non-touch user interface 116. The speaker holes 122 and speaker openings 422 are respectively located on the edge side wall 304 of the non-touch user interface 116 and the interior aperture wall 404 of the elongated aperture 114 within recess 402. The corresponding speaker holes 122 and speaker openings 422 form acoustic paths to an internal speaker. The first and second rows of speaker holes 122 of side edge wall 304 align with corresponding first and second rows of speaker openings 422 formed in the interior aperture wall 404 of the elongated aperture 114. Accessibility to the speaker porting (by user touch) has advantageously been minimized by placing the porting within the walls (holes 122 in edge side wall 304, and openings 422 in interior aperture wall 404) of the recess 402. Stacking or overlapping of user interface features has been avoided. The plurality of non-touch user interface features 118 are non-overlapping, stationary features, without the need for movable components.

Figure 5:
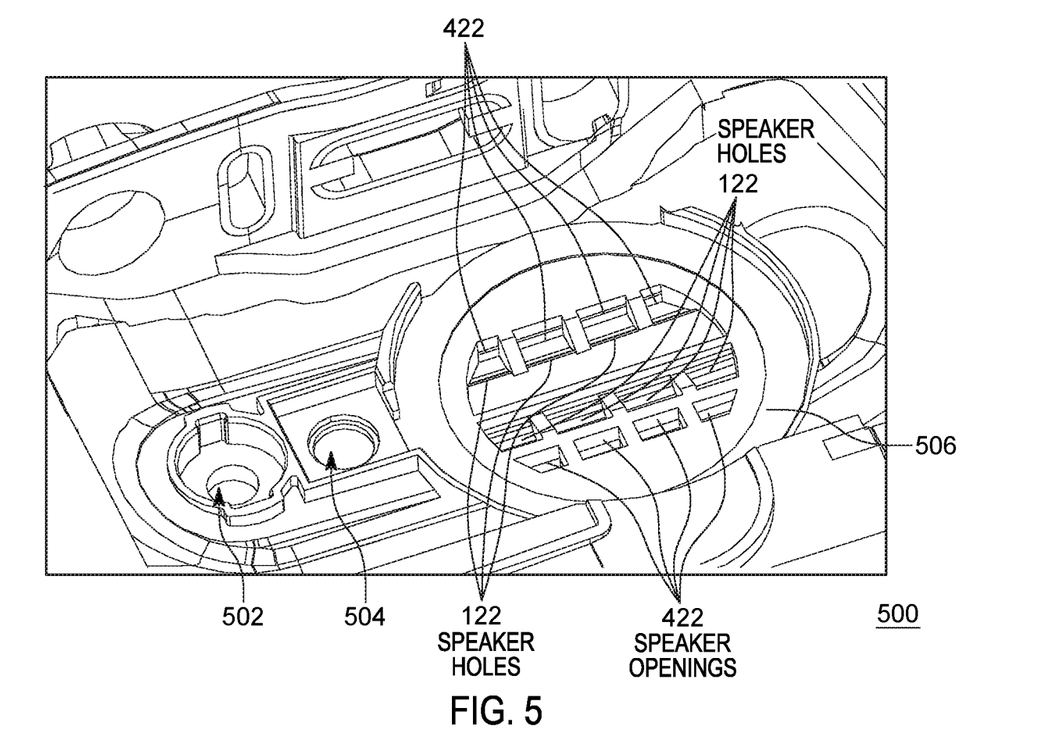
FIG. 5 is a partial interior view of the portable communication device housing in accordance with the various embodiments.

FIG. 5 is a partial interior view 500 of the portable communication device housing in accordance with the various embodiments. In this view the interior housing includes first and second cavities 502, 504 for receiving a flash module and a camera module (shown later in FIG. 6). First and second cavities 502, 504 are formed within the housing as part of the interior of the non-touch user interface 116.

This view 500 shows the plurality of speaker holes 122 forming acoustic paths with corresponding speaker openings 422. Two rows of acoustic paths are provided. The two rows of speaker holes 122 with corresponding speaker openings 422 form part of the visible non-touch user interface zone 120, as shown in other views. The interior housing further comprises a speaker mount 506 formed therein as part of the housing, the speaker mount surrounding the two rows of acoustic paths.

Figure 6:
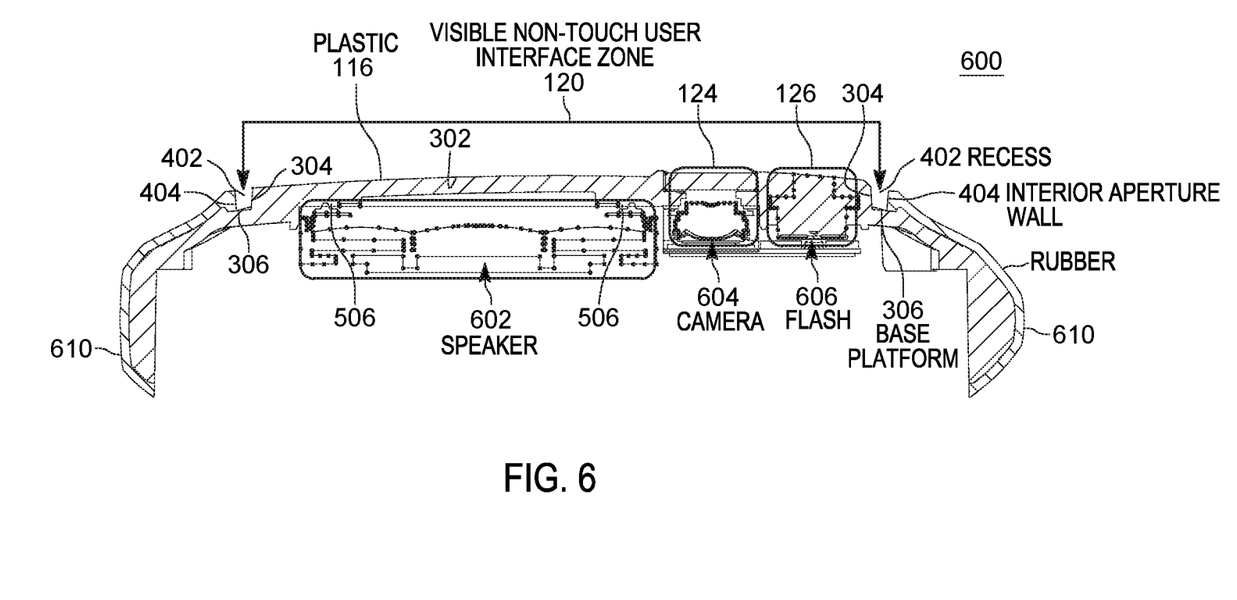
FIG. 6 is a partial cross-sectional interior view of portable communication device in accordance with the various embodiments.

FIG. 6 is a partial cross-sectional interior view 600 of portable communication device in accordance with the various embodiments. A speaker 602 is seated upon the speaker mount 506 to align the speaker with the acoustic paths formed by the visible non-touch user interface zone 120. A camera module 604 is located beneath the camera lens of the visible non-touch user interface zone 120. A flash module is coupled beneath the flash lens 126 of the visible non-touch user interface zone 120.

View 600 also shows the elongated top planar surface 302, the edge side wall 304 descending downward from the elongated top planar surface, and the base platform 306 extending from the edge side wall. View 600 also shows the recess 402 formed of the interior aperture wall 404 meets with the base platform 306.

In accordance with some embodiments, the portable communication device 100 may further comprise a protective rubberized coating 610 forming a monoform form factor over portions of the hard plastic housing of the portable communication device. The protective rubberized coating 610 may be overmolded to cover portions of the plastic housing. such that the rubber surrounds the visible non-touch user interface zone 120, leaving the non-touch user interface 116 exposed as hard plastic. The delineation of rubberized coating and hard plastic provides a further visual emphasis to the user to handle the rubberized portions of the devices while refraining from touching the exposed hard plastic of non-touch user interface 116.

The monoform form factor of the speaker grill as part of the communication device housing wherein the speaker grill is a hard plastic and the portion of the housing surrounding the speaker grille is an overmolded rubberized coating beneficially provides an intuitive keep-out zone while providing both convenient access and protection to the non-touch user interface elements. The keep-out zone prevents inadvertent blocking of the speaker porting, the camera or the flash by a user while the portable communication device is being handed by the user.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A portable communication device, comprising:
    a housing formed as a monoform form factor having a plurality of housing surfaces comprising a top surface, a bottom surface, a front surface, a back surface, a first side surface and a second side surface;
    an elongated aperture formed on a surface of the plurality of surfaces, the elongated aperture being formed as an elongated rounded rectangular shaped aperture;
    a non-touch user interface residing within the elongated aperture, the non-touch user interface being formed of a single elongated rounded rectangular shaped body corresponding in shape to the elongated aperture, the elongated aperture with non-touch user interface residing therein defining a visible non-touch user interface zone including speaker porting; and
    a plurality of non-touch user interface features integrated on the single elongated rounded rectangular shaped body of the non-touch user interface, the plurality of non-touch user interface features being adjacently integrated and spaced apart side-by-side along the single elongated rounded rectangular shaped body of the non-touch user interface.

2. The portable communication device of claim 1, wherein the plurality of non-touch user interface features comprise:
    a camera; and
    a flash.

3. The portable communication device of claim 1, the plurality of non-touch user interface features are non-overlapping.

4. The portable communication device of claim 1, wherein the single elongated rounded rectangular shaped body of the non-touch user interface comprises:
    an elongated top planar surface, an edge side wall descending downward from the elongated top planar surface, and a base platform extending from and surrounding the edge side wall, the base platform forming a recess between the elongated aperture and the non-touch user interface residing therein.

5. The portable communication device of claim 4, the plurality of non-touch user interface features comprise:
    a plurality of speaker holes integrated within the edge side wall of the non-touch user interface;
    a camera lens integrated located within the top planar surface of non-touch user interface; and
    a flash lens integrated within the top planar surface of the non-touch user interface.

6. The portable communication device of claim 5, wherein the plurality of speaker holes formed in the edge side wall comprise:
    a first row of speaker holes on a first side wall of the edge side wall of the single elongated rounded rectangular shaped body; and
    a second row of speaker holes on an opposing second side wall of the edge side wall of the single elongated rounded rectangular shaped body.

7. The portable communication device of claim 5, wherein the plurality of speaker holes formed in the edge side wall form an acoustic path with corresponding speaker openings formed in an interior aperture wall of the elongated aperture.

8. The portable communication device of claim 5, further comprising:
    a speaker located beneath the plurality of speaker holes of the visible non-touch user interface zone;
    a camera module located beneath the camera lens of the visible non-touch user interface zone; and
    a flash module coupled beneath the flash lens of the visible non-touch user interface zone.

9. The portable communication device of claim 4, wherein the visible non-touch user interface zone defined by the elongated aperture with non-touch user interface residing therein extends along a horizontal axis across at least one of:
    the front surface of the housing between the first and second side surfaces; and
    the back surface of the housing between the first and second side surfaces.

10. The portable communication device of claim 4, wherein the edge side wall descending downward from the elongated top planar surface, comprises:
    a row of speaker holes.

11. The portable communication device of claim 10, further comprising:
    a push-to-talk (PTT) button located on a side surface.

12. The portable communication device of claim 1, wherein the housing is a plastic housing, and the portable communication device further comprises:
- a protective rubberized coating covering portions of the plastic housing, the rubberized coating surrounding the non-touch user interface zone and leaving the non-touch user interface exposed as hard plastic.

13. The portable communication device of claim 1, further comprising:
- a battery cover located below the visible non-touch user interface zone.

14. The portable communication device of claim 13, further comprising:
- a battery latch located on the battery cover beneath the visible non-touch user interface zone.

15. A portable communication device, comprising:
- a housing having a monoform form factor including a non-touch user interface residing within an elongated aperture having an interior aperture side wall, the non-touch user interface being formed of an elongated top planar surface having an edge side wall descending therefrom and extending into a base platform surrounding the edge side wall, the base platform and edge side wall forming a recess with the interior aperture wall of the elongated aperture;
- speaker porting residing within the recess, the speaker porting being formed of speaker holes formed within the edge side wall and speaker openings formed within the interior aperture wall; and
- a non-touch user interface feature residing on the top planar surface of the non-touch user interface.

16. A portable communication device, comprising:
- a housing having a plurality of housing surfaces comprising a top surface, a bottom surface, a front surface, a back surface, a first side surface and a second side surface;
- an elongated aperture formed on a surface of the plurality of surfaces, the elongated aperture being formed as an elongated rounded rectangular shaped aperture;
- a non-touch user interface residing within the elongated aperture, the non-touch user interface being formed of a single elongated rounded rectangular shaped body corresponding in shape to the elongated aperture, the elongated aperture with non-touch user interface residing therein defining a visible non-touch user interface zone on the surface of the portable communication device;
- wherein the single elongated rounded rectangular shaped body comprises an elongated top planar surface, an edge side wall descending downward from the elongated top planar surface, and a base platform extending from and surrounding the edge side wall, the base platform forming a recess between the elongated aperture and the non-touch user interface residing therein;
- a plurality of speaker holes integrated within the edge side wall of the non-touch user interface, the plurality of speaker holes comprising:
  - a first row of speaker holes on a first side wall of the edge side wall of the single elongated rounded rectangular shaped body; and
  - a second row of speaker holes on an opposing second side wall of the edge side wall of the single elongated rounded rectangular shaped body.

17. The portable communication device of claim 16, wherein the housing and non-touch user interface are formed of a monoform form factor.

\* \* \* \* \*